(12) United States Patent  
Falk et al.

(10) Patent No.: US 8,981,935 B2  
(45) Date of Patent: Mar. 17, 2015

(54) METHOD AND SYSTEM FOR SUPPLYING TARGET INFORMATION

(75) Inventors: Rainer Falk, Erding (DE); Andreas Köpf, Mümchen (DE); Hermann Seuschek, München (DE)

(73) Assignee: Siemens Aktiengesellschaft, Munich (DE)

( * ) Notice: Subject to any disclaimer, the term of this patent is extended or adjusted under 35 U.S.C. 154(b) by 882 days.

(21) Appl. No.: 13/139,096

(22) PCT Filed: Sep. 8, 2009

(86) PCT No.: PCT/EP2009/061596  
§ 371 (c)(1),  
(2), (4) Date: Jun. 10, 2011

(87) PCT Pub. No.: WO2010/066480  
PCT Pub. Date: Jun. 17, 2010

(65) Prior Publication Data  
US 2011/0248852 A1    Oct. 13, 2011

(30) Foreign Application Priority Data

Dec. 10, 2008   (DE) .................. 10 2008 061 481

(51) Int. Cl.  
*G08B 13/14* (2006.01)  
*G06Q 10/08* (2012.01)  
(Continued)

(52) U.S. Cl.  
CPC .......... *G06Q 10/08* (2013.01); *G06F 17/30876* (2013.01); *H04L 63/0428* (2013.01);  
(Continued)

(58) Field of Classification Search  
CPC .............. G06K 17/00; G06K 7/10108; G06K 17/30876; H04L 63/0492; H04L 63/06; H04L 63/061  
USPC ............. 340/572.1, 10.1, 505, 539.27, 10.51, 340/572.4, 5.1, 10.4, 10.3, 5.8; 713/176, 713/156, 162, 168, 158, 171, 160; 235/383; 709/220, 228  
See application file for complete search history.

(56) References Cited

U.S. PATENT DOCUMENTS 6,744,528 B2    6/2004  Picoult et al. ................. 358/1.15  
7,629,886 B2 *  12/2009  Steeves ....................... 340/572.1  
(Continued)

FOREIGN PATENT DOCUMENTS

CN    1710764 A    12/2005    ............. H01S 3/091  
CN    1728162 A     2/2006    ............. G06K 17/00  
(Continued)

OTHER PUBLICATIONS

International PCT Search Report and Written Opinion, PCT/EP2009/061596, 15 pages, Jan. 13, 2010.  
(Continued)

*Primary Examiner* — Hoi Lau  
(74) *Attorney, Agent, or Firm* — King & Spalding L.L.P.

(57) ABSTRACT

In a method and a system (1) for providing target information of an event message for an event occurring at a tag reader (2), the target information is extracted from a signed digital certificate of a tag (4). The event is triggered at a tag reader (2) and can be evaluated by a target computer (6), for example a server. The method and system enhance reconfiguration flexibility and also increase security against manipulation.

18 Claims, 4 Drawing Sheets

(51) Int. Cl.
*G06F 17/30* (2006.01)
*H04L 29/06* (2006.01)
*G06K 7/10* (2006.01)
*G06K 17/00* (2006.01)

(52) U.S. Cl.
CPC ............ *G06K7/10108* (2013.01); *H04L 63/06* (2013.01); *H04L 63/061* (2013.01); *H04L 63/0492* (2013.01); *G06K 17/00* (2013.01)
USPC ........ 340/572.1; 340/505; 340/5.1; 340/10.4; 340/572.4; 340/5.8

(56) References Cited

U.S. PATENT DOCUMENTS

| | | | |
|---|---|---|---|
| 7,683,773 B1* | 3/2010 | Goodall et al. ................ | 340/505 |
| 7,864,040 B2 | 1/2011 | Bozionek et al. ........... | 340/539.1 |
| 8,674,807 B2* | 3/2014 | Lauronen ..................... | 340/10.1 |
| 2003/0137396 A1* | 7/2003 | Durej et al. .................... | 340/3.5 |
| 2003/0161475 A1* | 8/2003 | Crumly et al. ................ | 380/280 |
| 2004/0046642 A1* | 3/2004 | Becker et al. .............. | 340/10.32 |
| 2004/0268132 A1* | 12/2004 | Waris ............................ | 713/185 |
| 2005/0177725 A1* | 8/2005 | Lowe et al. ................... | 713/176 |
| 2005/0199716 A1* | 9/2005 | Shafer et al. ................. | 235/385 |
| 2005/0281308 A1 | 12/2005 | Kim ............................... | 372/70 |
| 2006/0026316 A1* | 2/2006 | Milenkovic et al. ........... | 710/62 |
| 2006/0136726 A1* | 6/2006 | Ragnet et al. ................ | 713/171 |
| 2006/0230276 A1* | 10/2006 | Nochta ......................... | 713/176 |
| 2008/0079549 A1* | 4/2008 | Yamada et al. .............. | 340/10.5 |
| 2008/0122622 A1* | 5/2008 | Archer et al. ............... | 340/572.1 |
| 2008/0195858 A1 | 8/2008 | Nguyen ........................ | 713/151 |
| 2008/0204243 A1* | 8/2008 | Backes et al. ............. | 340/572.1 |
| 2008/0208753 A1 | 8/2008 | Lee et al. ....................... | 705/51 |
| 2008/0301307 A1* | 12/2008 | Son et al. ..................... | 709/228 |
| 2009/0009298 A1* | 1/2009 | Brissman et al. .......... | 340/10.51 |
| 2009/0136027 A1* | 5/2009 | Salowey et al. .............. | 380/45 |
| 2010/0039229 A1* | 2/2010 | Westerlund et al. ......... | 340/10.1 |
| 2010/0079237 A1* | 4/2010 | Falk et al. ...................... | 340/5.8 |
| 2010/0141402 A1* | 6/2010 | Eun et al. .................... | 340/10.41 |
| 2011/0248852 A1 | 10/2011 | Falk et al. ................... | 340/572.1 |
| 2012/0124373 A1* | 5/2012 | Dangoor et al. .............. | 713/168 |

FOREIGN PATENT DOCUMENTS

| | | | |
|---|---|---|---|
| CN | 1996350 A | 7/2007 | ............. G06K 17/00 |
| CN | 101192234 A | 6/2008 | ............. G06F 17/30 |
| CN | 101194528 A | 6/2008 | ............. G06K 17/00 |
| CN | 101236677 A | 8/2008 | ............. G06K 19/06 |
| DE | 102005025806 A1 | 12/2006 | ............. H04L 9/32 |
| EP | 1710764 A1 | 10/2006 | ............. G07G 1/00 |
| JP | 2004258734 A | 9/2004 | ............. G06K 17/00 |
| WO | 03052585 A2 | 6/2003 | ................ G06F 9/00 |
| WO | 2010/066480 A1 | 6/2010 | ............. G06Q 10/00 |

OTHER PUBLICATIONS

German Examination Report, German patent application No. 102008061481.5-53, 4 pages, Aug. 10, 2009.

Lehtonen, et al., "Features, Identity, Tracing, and Cryptography in Product Authentication", Proceedings of the 13$_{th}$ International Conference on Concurrent Enterprising, XP002560506, 8 pages, Jun. 2007.

Framling, et al., "Globally Unique Product Identifiers—Requirements and Solutions to Product Lifecycle Management", IFAC Symposium on Information Control Problems in Manufacturing, XP002560505, 6 pages, May 2006.

Traub, et al., "The EPCGlobal Architecture Framework", Internet citation: www.epcglobal.org/standards/architecture/Architecture_1_0-StandardApproved-20050701.pdf, 53 pages, Jul. 1, 2005.

Chinese Office Action, Application No. 200980149703.8, 10 pages, May 15, 2013.

* cited by examiner

METHOD AND SYSTEM FOR SUPPLYING TARGET INFORMATION

CROSS-REFERENCE TO RELATED APPLICATIONS

This application is a U.S. National Stage Application of International Application No. PCT/EP2009/061596 filed Sep. 8, 2009, which designates the United States of America, and claims priority to German Application No. 10 2008 061 481.5 filed Dec. 10, 2008, the contents of which are hereby incorporated by reference in their entirety.

TECHNICAL FIELD

The invention relates to a method and a system for providing, in a manner which is secure against manipulation, at least one piece of target information, in particular routing information, which is embedded in a signed digital certificate of a tag.

BACKGROUND

Tags or markers, for example RFID tags, may be used for many different applications, in particular in the fields of logistics, maintenance and access control. In this connection, such tags may be attached to product packaging or to the product itself. It is also possible for such tags to be integrated in a product. Goods or products provided with tags may be tracked in a logistical chain in which the goods pass through different locations, enterprises and systems. Tags are read by associated tag reader systems or readers. The presence of a tag or the detection of a tag represents an event. This event may consist, for example, of an elementary base event in the form of a data access to the tag or an application-specific event of an application program. If a tag is read by a reader, this represents on the one hand a base event in the form of a data access to the tag and on the other hand may also represent an event on an application plane, for example goods inward in a warehouse. For the purpose of their evaluation the events are supplied to the application program, which may be executed on a different computer from the reader. For example, an application event is evaluated by means of an application program running on a remote target computer. In conventional systems such events which are triggered by a tag are selectively forwarded by the reader to a target computer provided for that purpose. The event message is switched by the reader to a target computer of the background system, which evaluates the event message.

A considerable drawback of such systems is that they are totally inflexible. If, for example, the system is reconfigured such that the application program for evaluating an event is executed on a new and/or different computer, it may be necessary to reconfigure the forwarding of the event message by the reader so that the event messages are redirected or switched to the new target computer. This reconfiguration of the event forwarding represents a considerable overhead. Moreover, such a reconfiguration is very susceptible to error and results in event messages being forwarded incorrectly. It may therefore happen that an application program which is executed on a new target computer does not receive a necessary event message and thus delivers an incorrect evaluation result. Moreover, there is the possibility that unauthorized third parties will intentionally divert event messages in order to manipulate their evaluation.

SUMMARY

According to various embodiments, a method and a system for managing event messages can be provided which permit flexible reconfiguration.

According to an embodiments, in a method for providing at least one piece of target information of an event message for an event occurring at a tag reader, the target information can be extracted from a signed digital certificate of a tag.

According to a further embodiment, the event message can be forwarded via a network to at least one target computer which is addressed by means of the target information. According to a further embodiment, the event message may have a tag ID of the tag and a reader ID of the tag reader. According to a further embodiment, the event message may contain information data which includes location data of the tag reader, an event time and the payload data provided by the tag. According to a further embodiment, an event triggered by a tag can be reported in an associated event message to the target computer addressed by the target information provided the tag is authenticated by the tag reader by means of a public tag key which is extracted from the signed certificate which is transmitted from the respective tag to the tag reader. According to a further embodiment, the event triggered by a tag may consist of a base event in the form of a data access to the tag or an application-specific event of an application program. According to a further embodiment, the extracted target information may have at least one target address which consists of a URL address, an IP address or a MAC address of a target computer. According to a further embodiment, the extracted target information can be a compressed mapping value which references a target address stored in a memory.

According to another embodiment, in a system for providing at least one piece of target information of an event message for an event occurring at a tag reader, the target information may be contained in a signed digital certificate of a tag.

According to a further embodiment of the system, the event message may include a data packet which may be forwarded via at least one network to a target computer which is addressed by the target information. According to a further embodiment of the system, the event message may contain information data which includes location data of the tag reader, an event time and payload data provided by a tag. According to a further embodiment of the system, the tag reader can be mobile in terms of its location and has a location detection device for generating location data.

According to yet another embodiment, a tag for a system as described above, may comprise a radio interface for exchanging data with the tag reader, a nonvolatile memory having a reserved memory area for a signed digital certificate and having an unreserved memory area for payload data, and an authentication unit for authenticating the tag.

According to a further embodiment of the tag, the tag may comprise at least one sensor for generating sensor payload data. According to a further embodiment of the tag, the tag can be an RFID tag which is attached to product packaging or to a product, or is integrated in a product.

BRIEF DESCRIPTION OF THE DRAWINGS

Embodiments of the system and of the method for providing target information for an event message are described below with reference to the attached drawings, in which.

DETAILED DESCRIPTION

According to various embodiments, in a method for providing at least one piece of target information of an event message for an event occurring at a tag reader, the target information is extracted from a signed digital certificate of a tag.

An advantage of the method according to various embodiments is that the target information of an event message is provided in a manner which is secure against manipulation, in other words it is not readily possible for the event message to be deliberately diverted by a third party.

In an embodiment variant of the method, the event message is forwarded via a network to a target computer which is addressed by means of the target information. In this case the event message may be forwarded directly or indirectly.

In a possible embodiment variant of the method, the event message has a tag ID of the tag and a reader ID of the tag reader. This information makes it possible for the location at which the event occurred to be taken into account during the evaluation.

In an embodiment variant of the method, the event message contains information data which includes location data of the tag reader, an event time and payload data provided by the tag.

In a possible embodiment variant, the tag reader is a mobile reader. In this case, in a possible embodiment variant, the mobile reader may contain an integrated GPS receiver which provides location data of the tag reader.

In a possible embodiment variant, the tag has one or more sensors which deliver sensor data which is forwarded as payload data in the event message.

In a possible embodiment variant of the method, an event triggered by a tag is reported in an associated event message to the target computer addressed by the target information, provided the tag is authenticated by the tag reader by means of a public tag key which is extracted from the signed certificate transmitted from the respective tag to the tag reader.

In this embodiment variant the forwarding of the event message takes place only after the authentication of the respective tag has been completed and consequently is particularly secure against manipulation.

In an embodiment variant of the method, the event triggered by the tag consists of a base event in the form of a data access to the tag. Said data access may be a read or write operation.

In an alternative embodiment variant, the event triggered by the tag consists of an application-specific event of an application program. This application program may be executed on the tag reader itself or on a remote target computer. The application program evaluates the application-specific event.

In an embodiment variant of the method, the extracted target information consists of a target address, wherein said target address can be a URL address, an IP address or a MAC address of a target computer.

In a possible embodiment variant, the extracted target information may also comprise a plurality of target addresses of a signal path so that it may be ensured that the event message passes from the tag reader to the target computer via a desired signal path which may comprise a plurality of computers. As a result the security of the system against manipulation is increased.

In an alternative embodiment variant, the extracted target information is a compressed mapping value which references a target address and/or signal path stored in a memory. The compressed mapping value may, for example, be a hash value of an address. This embodiment offers the advantage that only the compressed mapping value has to be stored in a data memory on the tag, and thus memory space can be saved in the tag.

According to other embodiments, in a system for providing at least one piece of target information of an event message for an event occurring at a tag reader, the target information is contained in a signed digital certificate of a tag.

In a possible embodiment variant of the system, the event message comprises a data packet which may be forwarded via at least one network to a target computer which is addressed by the target information.

In a possible embodiment variant of the system, the event message contains information data which includes location data of the reader, an event time and payload data provided by the tag.

In a possible embodiment variant of the system, the tag reader is mobile in terms of its location and has a location detection device for generating location data.

According to yet other embodiments, a tag and a system for providing target information of an event message for an event occurring at a tag reader can be provided, wherein the target information is contained in a signed digital certificate of the tag, the tag comprising:
- a radio interface for the exchange of data with the tag reader,
- a nonvolatile memory having a reserved memory area for a signed digital certificate and having an unreserved memory area for payload data, and
- an authentication unit for authenticating the tag.

In a possible embodiment variant of the tag, the tag has at least one sensor for generating sensor payload data.

In a possible embodiment variant of the tag, the tag is an RFID tag.

In a possible embodiment variant of the tag, the tag is attached to product packaging or to a product.

In a further embodiment variant of the tag, the tag is integrated in a product.

Figure 1:
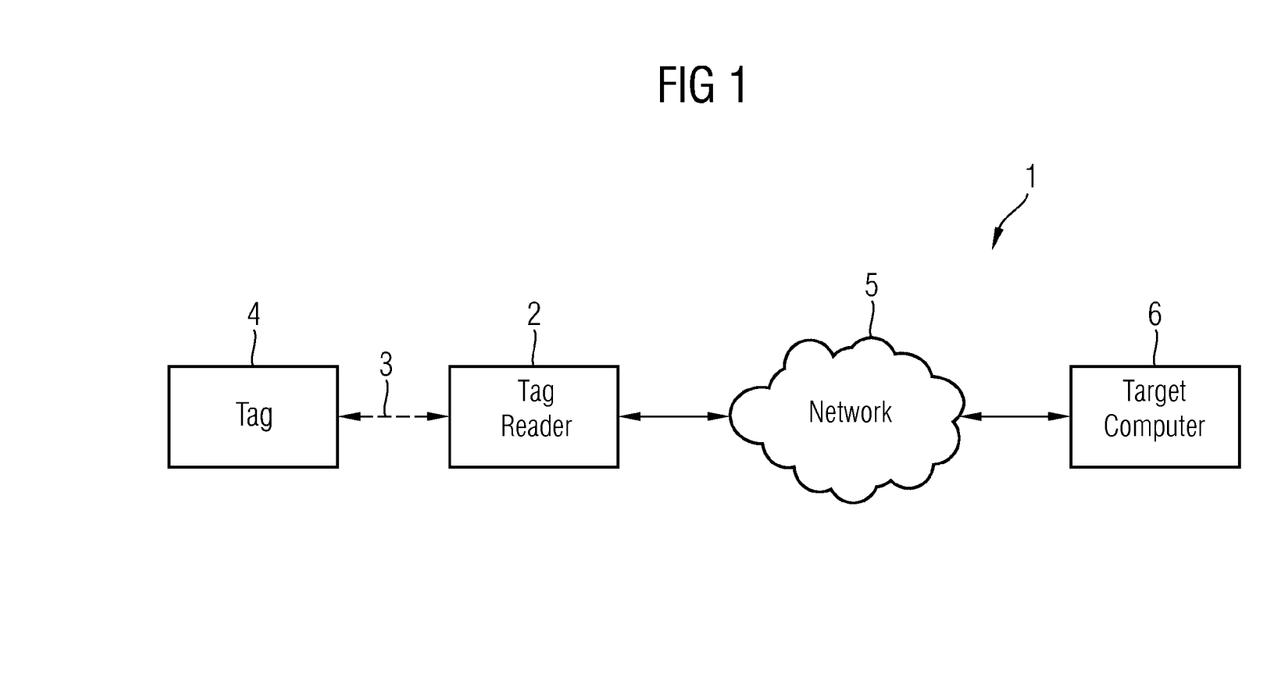
FIG. 1 shows a block diagram of a possible embodiment variant of the system.

As may be seen in FIG. 1, the system 1 according to various embodiments comprises at least one tag reader 2 which can communicate with a tag 4 via a radio interface 3. The tag reader 2 is connected via a data network 5 to a target computer 6. The tag reader 2 may be a permanently installed reader which, for example, is located at the door of a warehouse. Alternatively, the tag reader 2 may also be a mobile reader which, for example, has a GPS receiver.

The tag 4 shown in FIG. 1 may be attached to a product or to product packaging. In a further possible embodiment variant, the tag 4 is integrated inside an object, for example inside a tagged spare part. The tagged products may, for example, be spare parts for the automobile or aircraft industry.

In an embodiment variant, the tag 4 is an RFID tag. The RFID tag may be an active RFID tag with its own dedicated power supply or a passive RFID tag. In an alternative embodiment variant, the tag 4 may be a one-dimensional or multidimensional barcode.

In the method and system according to various embodiments, at least one piece of target information ZA of an event message, which reports an event occurring at the tag reader 2, is provided, the target information ZA being extracted from a signed digital certificate Z of the tag 4. The extracted target information ZA may in this case comprise at least one target address or indeed a plurality of target addresses. The addresses are, for example, a URL address, an IP address or a MAC address of the target computer 6. The extracted target information ZA may also be a compressed mapping value, for example a hash value, which references a target address stored in a memory. This memory may, for example, be located in the tag reader 2. In a possible embodiment variant, the event message may consist of a data packet which is forwarded via at least one network, for example the network 5, to the target computer 6 which is addressed by the target information ZA. Said data packet or event message may contain, in addition to the target information ZA, a tag ID of the tag 4 and a reader ID of the tag reader 2. Moreover, information data may be contained in the event message, such as for example location data of the tag reader 2, an event time of an event and in addition payload data which is supplied by the tag 4. The location data of the tag reader 2 may, for example, include the spatial coordinates of the installation site of the tag reader 2 or contain general location information, such as "warehouse A" or "Munich warehouse". In a possible embodiment variant, the tag 4 has one or more sensors which deliver sensor data which is transmitted as payload data in the event message to the target computer 6. The event time indicates a time at which a base event or an application-specific event of an application program occurred. The event time indicates, for example, the time at which the tag 4 is read by the tag reader 2.

Figure 2:
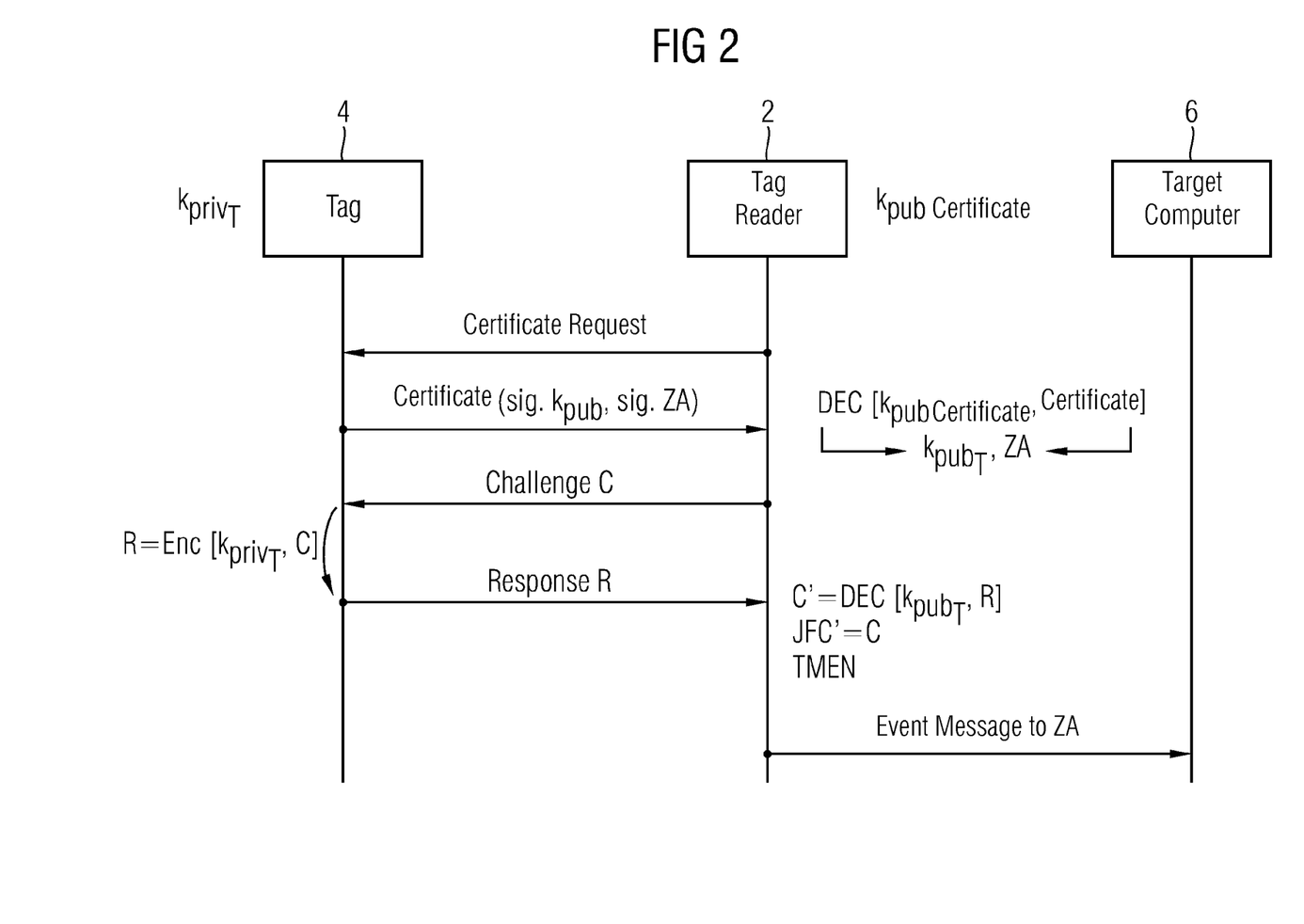
FIG. 2 shows a signal diagram for representing a possible embodiment variant of the system.

FIG. 2 shows a signal diagram for explaining a possible embodiment variant of the system 1.

The tag reader 2 initially requests a certificate Z from the tag 4. In this case, the tag reader 2 has a public key Kpub certificate which is provided by a certification center or a certification authority CA. As soon as the tag reader 2 receives the certificate Z from the tag 4, the tag reader 2 verifies the authenticity of the received signed digital certificate Z of the tag 4 with the aid of the public certificate key. In the method according to various embodiments, target information ZA about an event message to be generated is contained in the received signed digital certificate Z. Moreover, the certificate Z may contain a public key for authentication purposes. The certificate Z contains a digital signature which signs the public key KpubT of the tag 4 and the target information ZA. In a possible embodiment variant of the method, as soon as the tag reader 2 has the public key KpubT and the target information ZA, it can perform an authentication of the tag 4, for example by means of a challenge-response method. In said cryptographic challenge-response method the possession of a secret is requested indirectly in that a question (challenge) is addressed to the tag 4, which question the tag 4 can only answer (response) if the tag 4 is in possession of this secret. This secret is generally a cryptographic key. For example, the tag reader 2 sends a random number to the tag 4 and the tag 4 thereupon calculates an answer (response) with the aid of the secret key and sends said answer R back to the tag reader 2. In this case the secret or, as the case may be, the cryptographic key is not transmitted. The challenge-response method may be based on symmetric or asymmetric cryptography. An asymmetric cryptographic encryption offers the advantage of easier key management. So that the authenticity of the public key which is required for testing the tag 4 may be ensured, in the system according to various embodiments the contents of the transmitted certificate Z are used. In a possible embodiment variant, the certificate Z is in this case stored together with the public key in a readable form in a data memory of the tag 4. Private keys, in contrast, are not readable.

As shown in FIG. 2, the tag reader 2 transmits the challenge C, for example a random number, to the tag 4, which encrypts the received challenge C with the aid of the private tag key KPivT for the purpose of calculating a response R. The response R is then transmitted from the tag 4 to the tag reader 2 which, with the aid of the public tag key KpubT extracted from the certificate Z, decrypts or decodes the received response for the purpose of calculating a challenge C'. If the decrypted challenge C' is consistent with the transmitted challenge C, the tag 4 is authenticated and the tag reader 2 may report the event by transmitting an event message to the target computer 6 specified by the target information ZA. In this manner, the event triggered by the tag 4, for example a data access to the tag 4, is reported in an associated event message, for example in a data packet, to the target computer 6 addressed by the target information ZA, provided the tag 4 is authenticated by the tag reader 2 by means of the public tag key KpubT which is extracted from the signed certificate Z which is transmitted from the respective tag 4 to the tag reader 2.

In the exemplary embodiment variant shown in FIG. 2, the event message and/or data packet is directly transmitted to the target computer 6. In an alternative embodiment variant, not only a target address but also a plurality of addresses of a signal path and/or routing information are extracted from the certificate Z. In the method and the system according to various embodiments, therefore, routing information for tag and/or RFID events is embedded in the certificate Z of the respective tag 4 which is used by the reader 2 for authenticating the tag. This information encodes to which backend system or to which target computer 6 the tag event of the respective tag 4 is to be sent in order to be evaluated and/or stored there. This method considerably reduces the overhead involved in the configuration and management of the system 1, since it is not necessary to configure in the infrastructure information about the destination to which the tag or RFID event has to be transmitted. The routing information is also efficiently protected and coupled to the respective tag 4, since the tag certificate Z present anyway can be used and only has to be extended in terms of its functionality. This is relevant in particular for a multi-domain tag environment in which a common tag read infrastructure is used for different tags 4 from different issuers. The system 1 according to various embodiments is thus primarily suitable for independently operated tag applications which use a shared tag read infrastructure and/or shared tag readers 2. Moreover, an increase in efficiency is achieved by the system 1 according to various embodiments, since the tag event data is only transmitted to the intended target destination or to the desired target computer 6, and not to other entities. Moreover, no filter rules have to be administratively configured in the infrastructure. In the system 1 according to various embodiments, an increase in security is achieved in that only signed routing information is accepted by an event switching network. In this manner, for example, tag data introduced by attackers, for example, with modified payload data or so-called malware, can be immediately filtered out and is not processed further.

The digital certificate Z which is stored on the tag 4 in a data memory contains the public key of the tag which is used for authenticating the tag 4 and the associated signature of the certificate Z. Moreover, in the system 1 according to various embodiments information data about the destination or the target computer 6 is also encoded in the certificate Z for evaluation of the tag event data. This target information ZA specifies the destination to which the tag events of the respective tag 4 are to be transmitted.

In the system 1 and method according to various embodiments, information about the destination and/or the target information ZA is protected against manipulation, since it is encoded into the certificate data structure of the tag 4. The method according to various embodiments is particularly efficient because the tag certificate Z is in any case stored on the tag 4, transmitted to the reader 2 and verified there.

Thus only a small additional overhead is associated with the system 1 according to various embodiments since the tag reader 2 checks the tag certificate Z in any case.

In a possible embodiment variant, the target information may be coded as a URL. For example, "protocol information://rfid.siemens.com/track".

Optionally, a plurality of types of target information or destination information may also be entered in the certificate Z if the event is to be reported to a plurality of target computers 6. In a possible embodiment variant, it is additionally possible to encode which specific additional data (payload data) is to be delivered to the target computer 6 for the purpose of evaluating the event.

In a possible embodiment variant of the system 1, the actual target destination is not encoded, for example as a target address, but instead a mapping value of the target address is encoded. This has the advantage that a target destination ZA or a URL may be relatively long and for this reason take up a lot of memory space on the tag 4. The mapping value may, for example, be a hash value of the target address, the transmitted hash value being able to be resolved by the tag reader 2 into a full URL. For example, the hash value of the URL (for example SHA1 or MD5) may be stored, then subsequently translated by the tag reader 2 into the textual URL and/or target address with the aid of a database upon the hash value being received.

In a further possible embodiment variant, a wildcard expression or a regular expression of the destination or target information is encoded into the certificate Z. An example of this is namely "rfidevent://*.siemens.com/*" and in a separate memory area the actual destination is encoded on the tag 4, for example
"rfidevent://rfid.containertracking.industry.siemens.com/
  track/customer/317/".

This, however, is not part of the tag certificate Z and therefore is also not protected by the latter's digital signature. The use of wildcard expressions offers increased flexibility, protection by the certificate Z being nonetheless ensured. The tag certificate Z restricts the permitted target information or destination addresses. However, a modified target address may be stored on the tag 4, without a new certificate Z having to be issued for the respective tag 4 for that reason.

In a possible embodiment variant, a verification between the specified target information provided and the issuer of the digital certificate of the respective tag 4 may also take place. The issuer of the certificate Z is the authority that digitally signed the certificate Z, for example a certification center or certification authority CA. The target information provided or a destination is only accepted if it belongs to the issuer CA. This is preferably verified with reference to the certificate Z issued by the certification center CA. Information about the issuer may be encoded, for example "*.siemens.com". Using this information it is possible to verify whether the target information or the event destination matches the respective issuer, i.e. matches the information in the certificate Z. In this way it is possible to restrict for which target information ZA or destinations a certification center may issue tag certificates Z. In the system 1 according to various embodiments, embedding the routing information and/or the target information ZA in the digital certificate Z ensures this is protected by the digital signature of the certificate Z. This digital signature makes manipulating the routing information or routing data considerably more difficult. Moreover, this information may be efficiently verified, since the tag reader 2 evaluates the certificate Z of the tag 4 in any case.

Figure 3:
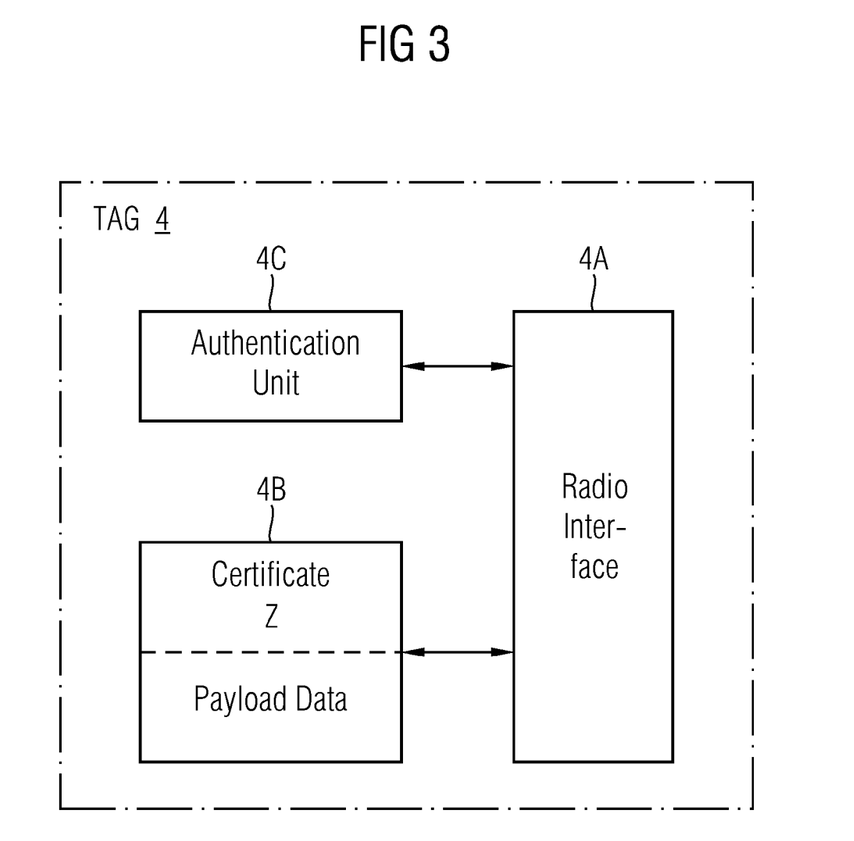
FIG. 3 shows a block diagram of a possible embodiment variant of a tag used in the system.

FIG. 3 shows a block diagram of a possible embodiment variant of a tag 4 such as may be used in the system 1. The tag 4 is, for example, an RFID tag. In the embodiment variant shown in FIG. 3, the tag 4 has a radio interface 4A for exchanging data with the tag reader 2. Moreover, the tag 4 contains a nonvolatile memory 4B. Said nonvolatile memory 4B has a reserved memory area for a signed digital certificate Z and an unreserved memory area for payload data. The nonvolatile memory 4B is, for example, a flash memory or $E^2PROM$ memory. Moreover, the tag 4 has an authentication unit 4C for authenticating the tag 4, for example by means of a challenge-response method. The authentication unit 4C has, for example, an integrated memory or a register for storing a non-readable private key KprivT. The certificate Z inside the nonvolatile memory 4B contains a signed public key KpbT of the tag 4 as well as routing information or target information ZA for forwarding the event message. The stored certificate Z is issued and signed by the certificate authority CA. This authority signs the contents of the certificate Z, i.e. the public key of the tag 4 and the target information ZA. The tag 4 shown in FIG. 3 may be attached to any product or product packaging. Moreover, the tag 4 may be integrated in an object. For example, providing high-value spare parts, for example spare parts for aircraft, with an integrated tag 4 according to FIG. 3 lends itself as a suitable means of ensuring original spare parts are used in the repair of aircraft.

Figure 4:
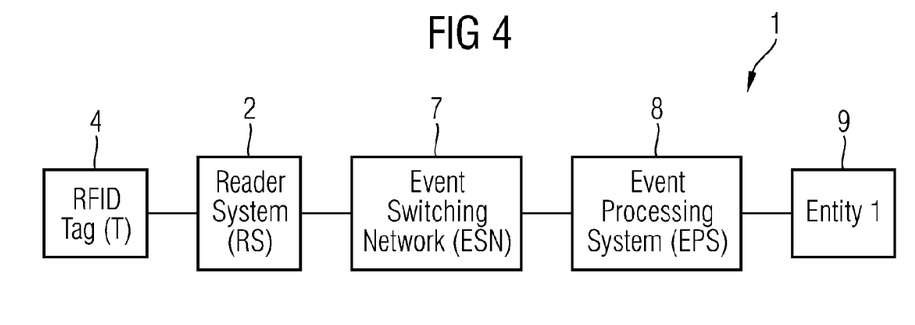
FIG. 4 shows a block diagram of a further exemplary embodiment of the system.

FIG. 4 schematically shows the layout of a system 1. This system 1 consists of one or more RFID tags 4 and one or more RFID readers 2, an event switching network 7, an event processing system 8, and one or more entities 9 which access the RFID event data. The event processing system 8 may be the target computer 6 shown in FIG. 1. In the exemplary embodiment shown in FIG. 4, the information relating to a read RFID tag 4 may be transmitted via the event switching network or the data network for forwarding the event message to the associated system for data processing of the event. The reported event is processed in the event processing system 8, the event being stored in a database for example. An entity or a device or an application program may access the acquired information in order to request the last-recorded location of a tag 4 for example, or to read sensor data acquired by a sensor of the tag 4, for example a temperature.

Figure 5:
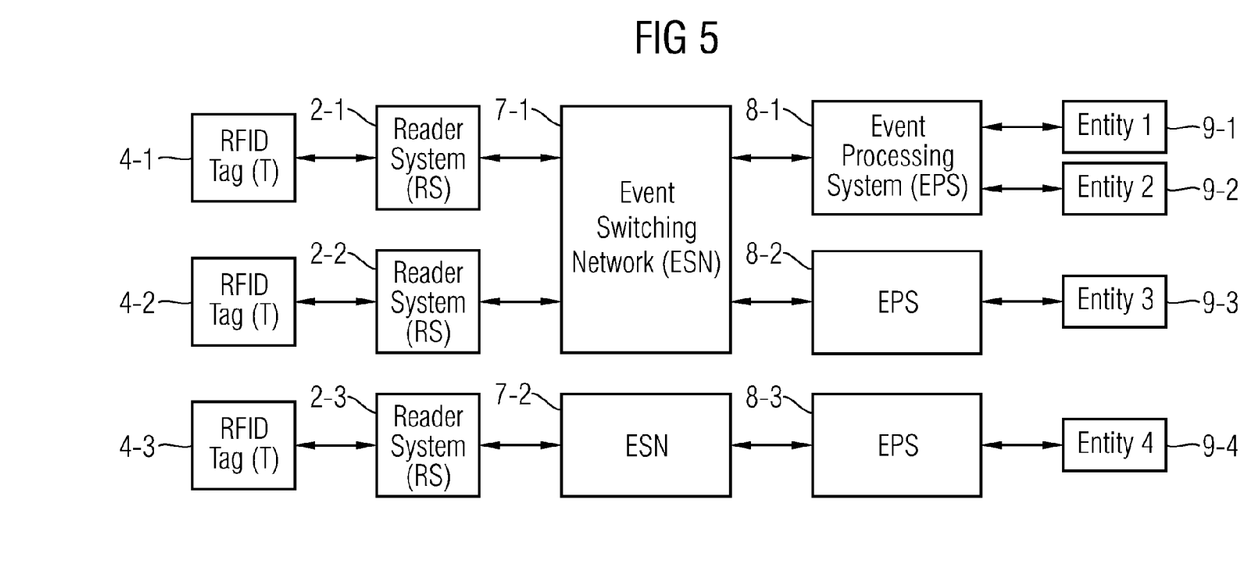
FIG. 5 shows a further block diagram of a possible embodiment variant of the system.

FIG. 5 shows a further exemplary embodiment of a system 1. In the exemplary embodiment shown in FIG. 5, two tag readers 2-1, 2-2 are present which are connected to a shared event switching network 7-1. The event switching network 7-1 is, for example, a network of a warehouse, the tag reader 2-1 being located at the entrance of the warehouse, and the tag reader 2-2 being positioned at an exit of the warehouse. In the exemplary embodiment shown in FIG. 5, a further tag reader 2-3 is located in a different warehouse and is connected to a separate event switching network 7-2. In the exemplary embodiment shown in FIG. 5, a server is provided for each tag reader for the purpose of event data processing. Different application programs and/or entities 9-1, 9-2, 9-3, 9-4 run on the different servers 8-1, 8-2, 8-3. In an alternative embodiment variant, the entities 9-1 to 9-4 are separate devices on which application software for evaluating event data of the tag 4 is executed in each case. The event may be transmitted in any form by a message or a data packet to the specified target address or target information. The event message may, for example, include an XML data or a text file. The network 5 shown in FIG. 1 may be made up of a plurality of subnetworks. In a possible embodiment variant, the network 5 is the internet. In a possible embodiment variant, the data can be transmitted from the tag reader 2 to the network 5 in a hard-wired manner. In an alternative embodiment variant, the data is transmitted between the tag reader 2 and the network 5 wirelessly via a radio interface.

In a possible embodiment variant, the target information embedded in the certificate Z is the target information of a target computer 6 as shown in FIG. 1. In an alternative embodiment variant, the target information ZA is the target information of another tag 4', i.e. in a possible embodiment variant the event triggered by the tag 4 shown in FIG. 1 is reported to another tag using the target information ZA. In this way, for example, payload data can be transferred from one tag to another in a targeted manner. Thus, for example, sensor data of one tag may be transferred to another tag for the purpose of its evaluation. In a possible embodiment variant, the tag 4 has not only a sensor but also an actuator. In a possible embodiment variant, actuators of another tag are controlled as a function of the sensor data originating in a first tag. The system according to various embodiments, as shown in FIG. 1, may be used in many different ways, in particular in the field of logistics, maintenance and access control.

What is claimed is:

1. A method for transferring payload data between tags, comprising:
    wirelessly communicating a certificate request to a first tag, the certificate request comprising a request for a digital certificate from the first tag,
    wirelessly receiving the digital certificate from the first tag, the digital certificate including target information comprising an address of a second tag,
    wirelessly receiving payload data from the first tag,
    extracting from the received digital certificate of the first tag the target information comprising the address of the second tag, and
    transferring the payload data from the first tag to the second tag using the address of the second tag extracted from the digital certificate of the first tag.

2. The method according to claim 1, comprising generating and forwarding an event message associated with an event triggered by the first tag via a network to at least one target computer addressed based on the extracted target information.

3. The method according to claim 2, wherein the event message has a tag ID of the first tag and a reader ID of tag reader.

4. The method according to claim 2, wherein the event message contains data which includes location data of the tag reader, an event time and the payload data received from the first tag.

5. The method according to claim 1, wherein the target information extracted from the first tag includes the address of the second tag and an address of a target computer, and wherein the method further comprises:
    authenticating the first tag by a tag reader based on a public tag key extracted from the digital certificate, and
    reporting an event triggered by the first tag by generating and sending an associated event message to the target computer addressed by the extracted target information.

6. The method according to claim 2, wherein the event triggered by the first tag comprises a base event in the form of a data access to the first tag or an application-specific event of an application program.

7. The method according to claim 5, wherein the address of the target commuter comprises a URL address, an IP address, or a MAC address of the target computer.

8. The method according to claim 1, wherein the extracted target information comprises a compressed mapping value which references a target address stored in a memory.

9. A system for transferring payload data between tags, comprising:
    a tag reader configured to:
        wirelessly communicate a certificate request to a first tag, the certificate request comprising a request for a digital certificate from the first tag,
        wirelessly receive the digital certificate from the first tag, the digital certificate including target information comprising an address of a second tag,
        wirelessly receive payload data from the first tag,
        extract from the received digital certificate of the first tag the target information comprising the address of the second tag, and
        forward the payload data for delivery to the second tag based on the address of the second tag extracted from the digital certificate of the first tag.

10. The system according to claim 9, wherein:
    the target information extracted from the first tag includes the address of the second tag and an address of a target computer, and
    forwarding the payload data for delivery to the second tag comprises generating and forwarding an event message associated with an event triggered by the first tag via at least one network to the target computer addressed by the extracted target information.

11. The system according to claim 9, wherein the event message contains data which includes location data of the tag reader, an event time and the payload data received from the first tag.

12. The system according to claim 9, wherein the tag reader is mobile and has a location detection device for generating location data.

13. A tag comprising:
    a radio interface for exchanging data with a tag reader,
    a nonvolatile memory having a reserved memory area for a signed digital certificate and having an unreserved memory area for payload data, and
    an authentication unit for authenticating the tag,
    wherein the signed digital certificate includes target information comprising the address of another tag, and
    wherein the tag is configured to:
        wirelessly receive a certificate request from the tag reader, the certificate request comprising a request for the signed digital certificate from the tag, and
        wirelessly transmit to the tag reader (a) the sinned digital certificate including target information comprising the address of the other tag, and (b) payload data, such that the tag reader can forward the payload data for delivery by the other tag using the address of the other tag included in the signed digital certificate.

14. The tag according to claim 13, wherein the tag comprises at least one sensor for generating sensor payload data.

15. The tag according to claim 13, wherein the tag is an RFID tag which is attached to product packaging or to a product, or is integrated in a product.

16. The tag according to claim 13, wherein the event message includes a data packet which may be forwarded via at least one network to a target computer which is addressed by the target information.

17. The tag according to claim 13, wherein the event message contains data which includes location data of the tag reader, an event time and the payload data provided by the first tag.

18. The tag according to claim 13, wherein the tag reader is mobile and has a location detection device for generating location data.

\* \* \* \* \*